(12) United States Patent
Bibby

(10) Patent No.: US 7,976,071 B2
(45) Date of Patent: Jul. 12, 2011

(54) FLUID CONNECTOR ASSEMBLY

(75) Inventor: Christopher Bibby, Bromsgrove (GB)

(73) Assignee: Land Rover, Warwickshire (GB)

( * ) Notice: Subject to any disclaimer, the term of this patent is extended or adjusted under 35 U.S.C. 154(b) by 201 days.

(21) Appl. No.: 11/425,007

(22) Filed: Jun. 19, 2006

(65) Prior Publication Data

US 2007/0029796 A1    Feb. 8, 2007

(30) Foreign Application Priority Data

Jul. 9, 2005 (GB) .................................. 0514172.6

(51) Int. Cl.
*F16L 37/00* (2006.01)

(52) U.S. Cl. ............... 285/308; 285/1; 285/93; 285/319

(58) Field of Classification Search .................. 285/319, 285/93, 305, 308, 1

See application file for complete search history.

(56) References Cited

U.S. PATENT DOCUMENTS

| | | | |
|---|---|---|---|
| 2,099,335 A * | 11/1937 | Hansen ....................... 251/149.6 |
| 2,898,130 A * | 8/1959 | Hansen .......................... 285/277 |
| 4,691,943 A * | 9/1987 | DeLand et al. ............... 285/315 |
| 4,781,400 A * | 11/1988 | Cunningham .................. 285/39 |
| 4,979,765 A | 12/1990 | Bartholomew |
| 5,374,088 A * | 12/1994 | Moretti et al. ................ 285/305 |
| 5,752,726 A * | 5/1998 | Fixemer .......................... 285/39 |
| 5,931,509 A | 8/1999 | Bartholomew |
| 6,082,779 A | 7/2000 | Lesser et al. |
| 2001/0015232 A1* | 8/2001 | Seghi ............................. 138/109 |
| 2002/0145283 A1* | 10/2002 | Miyajima et al. ............. 285/305 |

FOREIGN PATENT DOCUMENTS

| | | |
|---|---|---|
| DE | 9400905 | 3/1994 |
| JP | 2003-90476 | 9/2001 |

* cited by examiner

*Primary Examiner* — James M Hewitt
*Assistant Examiner* — Jay R Ripley
(74) *Attorney, Agent, or Firm* — Brooks Kushman P.C.

(57) ABSTRACT

A fluid connector assembly 10 for a fuel pipe of a motor vehicle comprises a plug 12 and a housing 11. The housing 11 has an end opening 23 and the plug 12 has a free end 26 for insertion through the end opening 23. The housing 11 also includes a seal housing portion 16 for receiving the free end 26 of the plug 12 and a coupling portion 17. The plug 12 includes first and second annular ribs 27, 28 spaced apart from each other and offset from the free end 26. The annular ribs 27, 28 are arranged to successively be held by a pair of grips 24 located inside the coupling portion when the plug 12 is inserted into the housing 11 in such a way that when the first annular rib 27 is retained by the grips 24 the plug 12 is sealed by seal means 18 in the seal housing portion 16 and when the second annular rib 28 is retained by the grips 24 the first annular rib 27 is housed between the coupling portion 17 and the seal housing portion 16.

8 Claims, 2 Drawing Sheets

FLUID CONNECTOR ASSEMBLY

Figure 1:
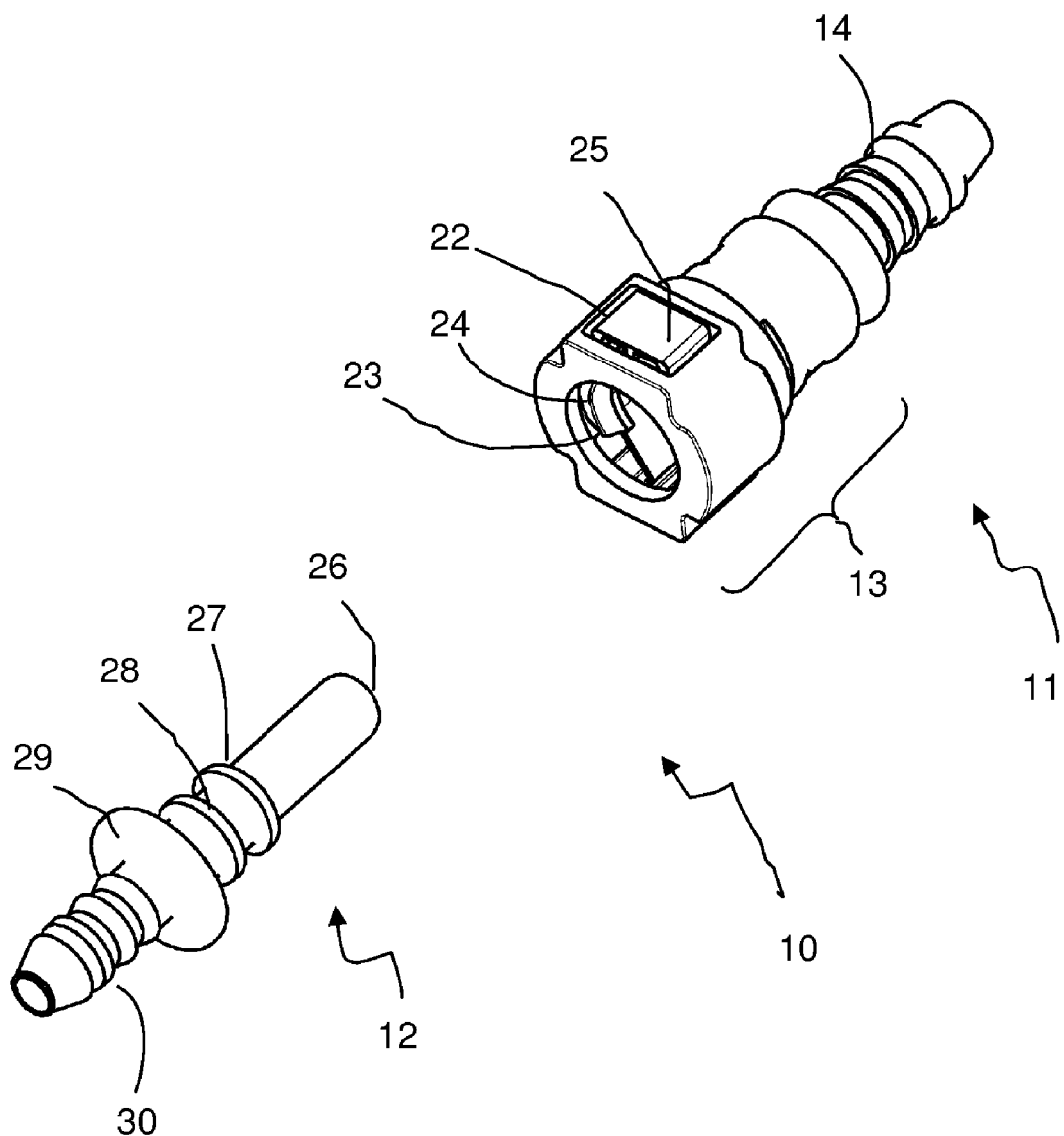

The present invention relates to a fluid connector assembly for use in making a sealed and locked connection through which a fluid can flow, and more particularly, to a connector assembly suitable for use with the fuel pipes of motor vehicles.

U.S. Pat. No. 6,652,007 shows such a connector assembly. It comprises a housing, a seal, a pipe and a retainer element for securing the pipe within the housing. The pipe includes an annular rib offset from one end, the end being inserted into the housing so as to be sealed by the seal and retained by resilient latching hooks which catch the annular rib upon complete insertion of the pipe into the housing. One disadvantage with such a connector is that as the sealing function is achieved before the hooks latch on the annular rib, it does not prevent the possibility of the connection forming a seal but not being mechanically locked. In such a situation, the connector could work loose as a result of vibration during operation and allow the joint to leak.

To overcome this issue it is known, for example from U.S. Pat. No. 5,931,509, to provide an additional pair of hooks which extend outside of the housing so as to cooperate with a second annular rib on the pipe, thus allowing for a visual inspection of the assembly. These additional hooks add to the cost and complexity of the housing and are vulnerable to catch on other components before the pipe is connected into the housing.

It is an object of this invention to provide a simple and cost effective device to ensure that complete connection has been accomplished.

According to a first aspect of the invention there is provided a fluid connector assembly comprising a tubular conduit and a housing, the housing having an end opening and the tubular conduit having a free end for insertion through the end opening, the housing also including a seal housing portion for receiving the free end of the tubular conduit and a coupling portion, wherein the tubular conduit includes first and second locking elements spaced apart from each other and offset from the free end, the locking elements being arranged to successively be held by a retainer element located inside the coupling portion when the tubular conduit is inserted into the housing in such a way that when the first locking element is retained by the retainer element the tubular conduit is sealed by seal means in the seal housing portion and when the second locking element is retained by the retainer element the first locking element is housed between the coupling portion and the seal housing portion.

Conveniently, the second locking element is visible when the first locking element is retained by the retainer element.

Preferably, each locking element comprises an annular rib.

Also preferably, the retainer element includes a release mechanism to allow the retainer element to be released from the locking element and allow the tubular conduit to be dismantled from the housing.

Conveniently, the tubular conduit includes an annular collar which is arranged to cover the end opening when the second locking element is held by the retainer element but is spaced from it when the first element is held by the retainer element.

Figure 2:
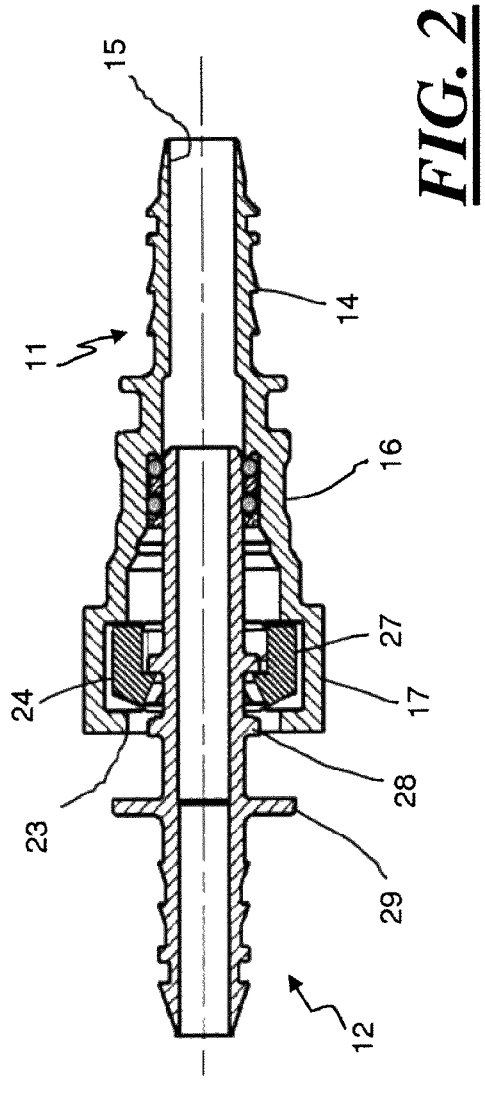
Figure 3:
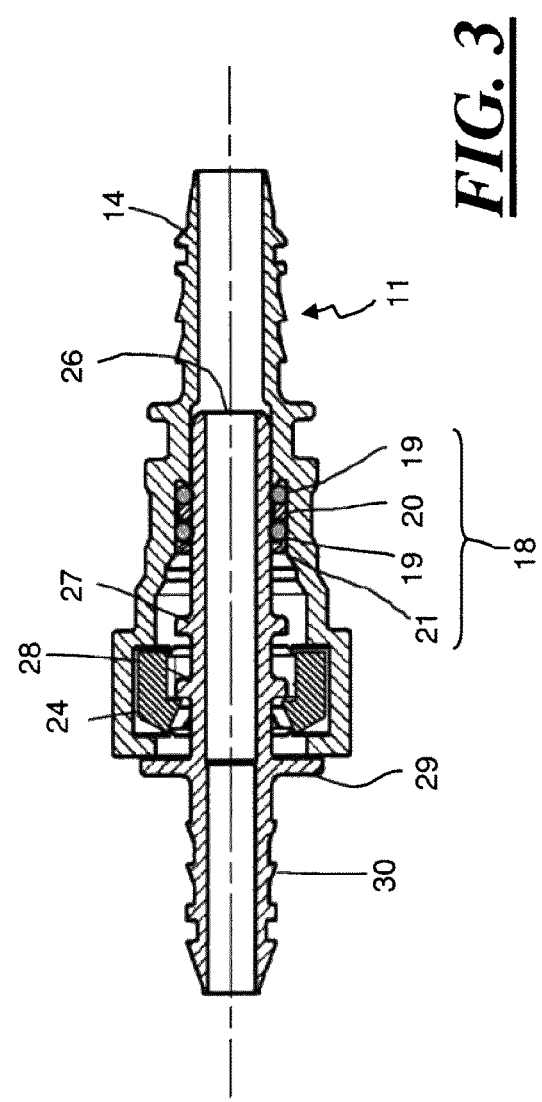

The invention will now be described by way of example with reference to the accompanying drawings of which:

FIG. 1 is an exploded perspective view of a fluid connector assembly according to the present invention;

FIG. 2 is a sectional view of the connector assembly of FIG. 1 in a pre-locking position; and FIG. 3 is a sectional view of the connector assembly of FIG. 1 in a locked position With reference to the drawings, there is shown a connector assembly 10 comprising a housing 11 and a tubular conduit in the form of a hollow plug 12 which can be connected into the housing 11.

The housing 11, preferably moulded from a plastics material, includes a connector body 13 and a spigot 14 for receiving a flexible tube (not shown) in a known manner. The connector body 13 has a stepped through bore 15, a seal housing portion 16 and a coupling portion 17. The seal housing portion 16 is fitted with a sealing means 18 which in this example includes a pair of 0-rings 19, a spacer 20 and a sleeve 21. The coupling portion 17 has a window 22 formed in its side wall for inserting a latch or retainer element 24 and an end opening 23 through which the plug 12 is inserted.

In this example the latch or retainer element comprises a pair of resilient grips or clips 24 which extend laterally inside the bore 15 and a release mechanism 25 in the form of a push member operable from outside the housing 11 as described in U.S. Pat. No.6,652 007 ,and which is included in the description by reference and thus will not be further described.

The plug 12 which is also preferably moulded from a plastics material includes two annular ribs 27, 28 spaced apart from each other and each offset from one of its free ends 26 by a predetermined length. The annular ribs 27, 28 have the same diameter and are conveniently referred to as the first 27 and the second 28 annular rib respectively. The plug 12 also has an annular collar 29. The other end of the plug includes a spigot 30 for receiving a flexible tube in a known manner.

When the plug 12 is pushed into the connector body 13, the free end 26 passes through the pair of resilient grips 24 without disturbing the grips 24, reaching the sealing means 18 where the 0-rings 19 are compressed to form a seal. However, when the first annular rib 27 reaches the grips 24 it forces them to expand in a radial direction to allow the first annular rib 27 to pass, the grips 24 snapping back into place as soon as the first annular rib 27 has passed this position, the first annular rib 27 acting as a locking element which is held by the grips 24. In this position, which can be referred to as the intermediate position as seen in FIG. 2, the connector is fluid tight and mechanically locked. It also ensures that the assembly operator will be visually informed by sight of the second rib 28 and the annular collar 29 that complete connection has not been accomplished. Pushing the plug 12 further into the connector body 13 will pass the second rib 28 through the grips 24 as for the first annular rib 27, the grips 24 snapping back into place as soon as the second annular rib 28 has passed this position. The annular collar 29 will then cover the end opening 23 of the connector body 13, completing the connection (FIG. 3). As it can be seen in FIG. 3, then the first annular rib 27 does not cooperate any longer with the grips and it is now only housed between the coupling portion 17 and the seal housing portion 16.

When it is desired to disassemble the connector 10 it is possible by pressing on the release mechanism 25 to release the grips 24 entirely from the annular ribs 28, 27 so that the plug 12 can be withdrawn.

The connector 10 described here provides effective sealing and a mechanical lock at the first insertion of the pipe and has the advantage that the assembly operator will visually notice an incomplete connection as the second annular rib 28 will be seen. In addition this connector 10 uses no additional parts outside the housing to provide the second latching and thus offers a package space similar to a connector without the visual device.

Although the invention has been described by way of example with reference to a specific embodiment of the invention various modifications may be made without departing from the invention. For example, the sealing means may include a variety of different arrangements. Similarly, the retainer element with the release mechanism may also include a variety of known different arrangement. In addition, the annular ribs 27 and 28 may be replaced by other locking elements such as two annular grooves, a retainer element being provided with a lip lock to the pipe 12. Also, the tubular plug could be replaced by a pipe, e.g. a thin metal pipe, where the annular ribs or other locking elements and possibly the annular collar are formed by swaging or upsetting.

The invention claimed is:

1. A fluid connector assembly comprising:
   a tubular conduit including first and second locking elements spaced apart from each other and offset from an open free end, the first and second locking elements adapted to lock the tubular conduit in first and second positions;
   a housing having an end opening configured to receive the tubular conduit and the housing also including a coupling portion and a seal housing portion;
   a seal fitted in the seal housing portion which seals against the outside surface of the free end of the tubular conduit in the first and second positions;
   a retainer element located inside the coupling portion, the retainer element configured to successively retain the first and second locking elements in order to releasably lock the housing and tubular conduit together in the first and second position;
   wherein when the tubular conduit is inserted into the housing in the first position, the first locking element is retained by the retainer element and when the tubular conduit is inserted into the housing in the second position, the second locking element is retained by the retainer element and the first locking element is housed between the retainer element and the seal housing portion such that the first locking element is no longer retained by the retainer element;
   wherein each locking element comprises an annular rib;
   wherein the retainer element includes a release mechanism to allow the retainer element to be released from the first or second locking element and allow the tubular conduit to be dismantled from the housing;
   wherein a window is defined in the coupling portion of the housing; wherein a window is defined in the coupling portion of the housing and the release mechanism is operable through the window; and
   wherein the housing and the tubular conduit form a substantially obstruction free flow path in both the first and second positions.

2. The fluid connector assembly as claimed in claim 1 wherein in the first position the second locking element is visible.

3. The fluid connector assembly as claimed in claim 1 in which the tubular conduit includes an annular collar which is arranged to cover the end opening in the first position but is spaced from it in the second position.

4. A fluid connector assembly comprising:
   a tubular conduit including first and second locking elements spaced apart from each other and offset from an open free end, the first and second locking elements adapted to lock the tubular conduit in first and second positions;
   a housing having an end opening configured to receive the tubular conduit and the housing also including a coupling portion and a seal housing portion, wherein a window is defined in a side wall of the coupling portion;
   a seal fitted in the seal housing portion which seals against the outside surface of the free end of the tubular conduit in the first and second positions;
   a retainer element located inside the coupling portion of the housing configured to successively engage the first and second locking elements in the first and second position;
   wherein when the tubular conduit is inserted into the housing in the first position, the first locking element is retained by the retainer element, and when the tubular conduit is inserted into the housing in the second position, the second locking element is retained by the retainer element, and the first locking element is housed between the coupling portion and the seal housing portion;
   wherein each locking element comprises an annular rib;
   wherein the retainer element includes a release mechanism to allow the retainer element to be released from the first or second locking element and allow the tubular conduit to be dismantled from the housing;
   wherein the release mechanism is operable through the window; and
   wherein the housing and the tubular conduit form a substantially obstruction free flow path in both the first and second positions.

5. The fluid connector assembly as claimed in claim 4 wherein in the first position, the second locking element is visible.

6. The fluid connector assembly as claimed in claim 4 in which the tubular conduit includes an annular collar which is arranged to cover the end opening when the second locking element is held by the retainer element but is spaced from it when the first element is held by the retainer element.

7. A fluid connector assembly comprising:
   a tubular conduit including first and second locking elements and an annular collar spaced apart from each other and offset from an open free end, the first and second locking elements adapted to lock the tubular conduit in first and second positions;
   a housing having an end opening configured to receive the tubular conduit, the housing further including a coupling portion and a seal housing portion;
   a seal fitted in the seal housing portion which seals against the outside surface of the free end of the tubular conduit in the first and second positions;
   a retainer element located inside the coupling portion, the retainer configured to successively hold the first and second locking elements;
   wherein when the tubular conduit is inserted into the housing in a first position, the first locking element is retained by the retainer element and the annular collar is spaced away from the end opening and the second locking element and the annular collar are visible outside the housing, and when the tubular conduit is inserted into the housing in a second position, the second locking element is retained by the retainer element and the annular collar is arranged to cover the end opening;
   wherein each locking element comprises an annular rib;
   wherein the retainer element includes a release mechanism to allow the retainer element to be released from the locking element and allow the tubular conduit to be dismantled from the housing;
   wherein the housing further includes a window defined in the coupling portion of the housing and the release mechanism is operable through the window;

wherein the release mechanism is operable along an axis transverse to an axis of the assembly; and wherein the housing and the tubular conduit form a substantially obstruction free flow path in both the first and second positions.

8. The fluid connector assembly as claimed in claim 7 wherein in the first position the second locking element is visible.

* * * * *

UNITED STATES PATENT AND TRADEMARK OFFICE
CERTIFICATE OF CORRECTION

| | | |
|---|---|---|
| PATENT NO. | : 7,976,071 B2 | Page 1 of 1 |
| APPLICATION NO. | : 11/425007 | |
| DATED | : July 12, 2011 | |
| INVENTOR(S) | : Christopher Bibby | |

It is certified that error appears in the above-identified patent and that said Letters Patent is hereby corrected as shown below:

Column 3, Line 46, Claim 1:

Delete "wherein a window is defined in the coupling portion of the housing;" (first occurrence).

Signed and Sealed this
Eighteenth Day of October, 2011

David J. Kappos
*Director of the United States Patent and Trademark Office*